United States Patent Office 3,502,690
Patented Mar. 24, 1970

3,502,690
(BIS - DIMETHYLAMINO)-(3 - PHENYL - 5 - AMINO-1,2,4-TRIAZOLO) - PHOSPHINEOXIDE TRIPHENYL-CHLOROSTANNATE
Ludwig Schroder, Klaus Thomas, Richard Sehring, and Dietrich Jerchel, Ingelheim am Rhein, Germany, assignors to C. H. Boehringer Sohn, Ingelheim am Rhein, Germany, a limited partnership of Germany
No Drawing. Filed Sept. 6, 1966, Ser. No. 577,197
Claims priority, application Germany, Sept. 3, 1965, B 83,585
Int. Cl. C07d 55/00
U.S. Cl. 260—299                                         1 Claim

ABSTRACT OF THE DISCLOSURE (Bis - dimethylamino) - (3 - phenyl - 5 - amino - 1,2,4-triazolo)-phosphineoxide triphenyl-chlorostannate, useful as an antimicrobial agent.

---

This invention relates to novel complex tin compounds as well as to a method of preparing them More particularly, the present invention relates to novel complex tin compounds composed of a phosphoric, phosphinic or phoshonic acid derivative moiety and a triorganic tin salt moiety, of the formula

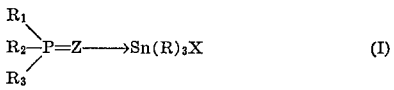

wherein

R is alkyl, vinyl, aryl, chloroaryl, methoxyparyl or benzyl, $R_1$ is amino; monoalkylamino; dialkylamino; monoalkenylamino, dialkenylamino; monocycloalkylamino, dicycloalkenylamino; N-alkyl-N-arylamino; aralkylamino; methylaralkylamino; haloaralkylamino; arylamino, where the aryl moiety may consist of a condensed ring system, such as naphthyl, and may have a methyl or halo substituent attached thereto; hydrazino; monoalkylhydrazino; monoalkenyl-hydrazino; monoaryl-hydrazino; N',N'-dialkyl-hyddazino; N',N' dialkenyl-hydrazino; N', N'-diaryl-hydrazino; monocycloalkyl-hydrazino; monocycloalkenyl-hydrazino; N',N'-dicpcloalkyl-hydrazino; N',N'-dicycloalkenyl-hydrazino; N-aminotriazino; alkoxy of 1 to 4 carbon atoms, which may have halo or hydroxy substituents attached thereto; alkyl thio of 1 to 4 carbon atoms, which may have halo or hydroxy substituents attached thereto; cycloalkoxy; arylalkoxy; were the aryl moiety may have halo or methyl substituents attached thereto; adyloxy, where the aryl moiety may have halo or methyl substituents attached thereto; arylthio, where the aryl moiety may have halo or methyl substituents attached thereto; a thio group attached to a heterocyclic ring system, such as benzthiazole; a heterocyclic radical, such as ethyleneimino, piperidino, pyrrolidino, aziridino, tetrahydroisoquinolino, morpholino, imidazolino or benzimidazolino; or a polymeric radical, such as

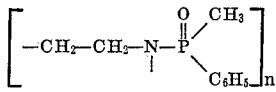

$R_1$ and $R_2$, together with each other and the phosphorus atom to which they are attached, form a monocyclic, condensed or polymeric ring system wherein the phosphorus atom is adjacent to an oxygen, sulfur or nitrogen atom.

$R_2$ and $R_3$ are each alkyl of 1 to 4 carbon atoms, which may have a halo-substituent attached thereto; alkenyl of 1 to 4 carbon atoms, which may have a halo-substituent attached thereto; hydroxyalkyl; aryl, which may have halo, alkyl or methoxy substituents attached thereto; aralkyl, which may have halo, alkyl or methoxy substituents attached thereto; halogen; amino; monoalkylamino; dialkylamino; monoalkenylamino; dialkenylamino; monocycloalkylamino; dicycloalkylamino; monocycloalkenyl-amino; dicycloalkenylamino; N-alkyl-N-aryl-amino; aralkylamino, which may have methyl or halo substituents attached thereto; arylamino, wherein the aryl moiety may consist of a condensed ring system, such as naphthyl, and which may have methyl or halogen substituents attached thereto; hydrazino; monoalkyl-hydrazino; monoalkenyl-hydrazino; monoaryl-hydrazino; N', N'-dialkyl-hydrazino; N',N'-dialkenyl-hydrazino; N',N'-diaryl-hydrazino; monocycloalkyl-hydrazino; monocycloalkenyl-hydrazino; N',N'-dicycloalkyl-hydrazino; N',N' - dicycloalkenyl-hydrazino; N-amino-triazino; alkoxy of 1 to 4 carbon atoms, which may have halogen or hydroxy substituents attached thereto; alkylthio of 1 to 4 carbon atoms, which may have halogen or hydroxy substituents attached thereto; cycloalkoxy; aralkoxy, whose aryl moiety may have halogen or methyl substituents attached thereto; aryloxy, which may have halogen or methyl substituents attached thereto; arylthio, which may have halogen or methyl substituents attached thereto; a thio group attached to a heterocyclic ring system, such as benzthiazole; or a heterocyclic radical, such as ethyleneimino, piperidino, pyrrolidino, aziridino, tetrahydroisoquinolino, morpholino, imidazolino or benzimidazolino;

Z is oxygen or sulfur, and

X is the anion of a hydrohalic acid, preferably hydrochloric or hydrobromic acid, or the anion of thiocyanic acid.

The complex pentacoordinated tin derivatives according to the present invention may be prepared by reacting a phosphorus compound of the formula

wherein $R_1$, $R_2$, $R_3$ and Z have the same meanings as in Formula I, with a tin salt of the formula

wherein R and X have the same meanings as in Formula I. The reaction is carried out at a temperature between 0 and 150° C., preferably 20 to 80° C., using advantageously equimolar amounts of the starting compounds. If the starting compounds are solids, the reaction is performed in the presence of a suitable inert organic solvent, such as methanol, ethanol, benzene, methylene chloride, acetone, ether or dimethylformamide; on the other hand, if the starting compounds are liquids, the reaction may be performed without a solvent.

The following examples further illustrate the present invention and will enable others skilled in the art to understand it more completely.

EXAMPLE 1

3.85 gm. (0.01 mol) of triphenyltin chloride and 3 gm. (0.01 mol) of (tris-piperidino)-phosphineoxide were each dissolved in separate 10 cc. portions of methanol, the solutions were combined, and the reaction solution was cooled to 0° C. 6.1 gm. (89% of theory) of tris-piperidino - phosphineoxide triphenyl - chloro - stannate, melting point 161–163° C., of the formula

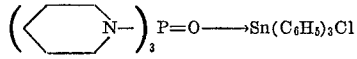

crystallized out.

EXAMPLE 2

A mixture of 3.85 (0.01 mol) of triphenyltin chloride and 2.28 gm. (0.01 mol) of (bis-dimethylamino)- phenoxyphosphineoxide was heated for five minutes at about 100° C., accompanied by stirring. Thereafter, the liquid reaction mixture was dissolved in a small amount of boiling isopropanol, and the solution was allowed to cool. 4 gm. (64.8% of theory) of (bis-dimethylamino)-phenoxy-phosphineoxide triphenyl-chloro-stannate, melting point 78–80° C., of the formula

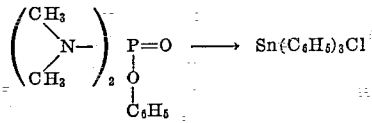

crystallized out.

Using a procedure analogous to that described in Examples 1 and 2, the following additional compounds of the formula

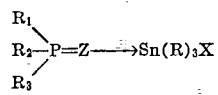

were prepared:

| Example No. | $\begin{array}{c}R_1\\R_2-P=\\R_3\end{array}$ | Z | R | X | Yield, percent of theory | Melting pt., °C. or boiling pt., °C./mm. Hg |
|---|---|---|---|---|---|---|
| 3 | [(CH₃)₂N]₃P= | O | C₆H₅ | Cl | 77 | 158–160 |
| 4 | [(CH₃)₂N]₂P=, OCH₃ | O | C₆H₅ | Cl | 88 | 97–102 |
| 5 | (⟨N⟩)₃P= | O | C₆H₅ | Cl | 78 | 130–131 |
| 6 | (⟨N⟩)₂P=, OCH₃ | O | C₆H₅ | Cl | 73 | 132–135 |
| 7 | (C₆H₅—N)₂P=, CH₃ OC₆H₅ | O | C₆H₅ | Cl | 49 | 91–92 |
| 8 | (C₄H₉NH)₂[P=, OC₆H₅ | O | C₆H₅ | Cl | 77 | 85–86 |
| 9 | (⟨⟩—NH)₃P= | O | C₆H₅ | Cl | 68 | 178–179 |
| 10 | (C₆H₅CH₂NH)₂[P=, OC₆H₅ | O | C₆H₅ | Cl | 90 | 89–90 |
| 11 | H₅C₂O\\H₉C₄NH—P=/(CH₃)₂N | O | C₄H₉ | SCN | 69 | 123/0.03 |
| 12 | CH₃O\\(C₂H₅)₂N—P=/(C₂H₅)₂N | O | H₃C\\CH/H₃C | SCN | 58 | 106/0.2 |
| 13 | (O⟨N⟩)₃P= | O | C₆H₅—CH₂ | Cl | 75 | 119–120 |
| 14 | (O⟨N⟩)₂P=, O-naphthyl | O | C₂H₅ | SCN | 78 | 98 |
| 15 | (O⟨N⟩)₂P=, O-(2-CH₃-4-Cl-phenyl) | O | C₃H₇ | Cl | 97.5 | 60–62 |
| 16 | (O—⟨⟩—Cl)₂P=, N-morpholinyl | O | C₆H₅ | Cl | 97 | 116 |

| Example No. | R₁<br>R₂—P=<br>R₃ | Z | R | X | Yield, percent of theory | Melting pt., °C. or boiling pt., °C./mm. Hg |
|---|---|---|---|---|---|---|
| 17 | (◯N)₃P= | O | CH₃ | Br | 87 | 106-108 |
| 18 | (CH₃O)₂P=<br>(N-morpholino) | O | C₄H₉ | Cl | 88.5 | 73/0.2 |
| 19 | [N(CH₃)₂]₂P=<br>H₉C₄O | O | C₄H₉ | Cl | 85 | 80/0.2 |
| 20 | (◯N)₂P=<br>S—(benzothiazolyl) | O | C₆H₅ | Cl | 55 | 105-108 |
| 21 | (N=CH–N–NH<br>N=CH)P=<br>(N-morpholino)₂ | O | C₆H₅ | SCN | 83 | 70-76 |
| 22 | N(CH₃)₂<br>N(CH₃)₂ P=<br>S–C₆H₅ | O | C₃H₇ | SCN | 79 | 125/0.03 |
| 23 | [N(CH₃)₂]₂P=<br>C₄H₉—S | O | C₄H₉ | Cl | 90 | 80/0.05 |
| 24 | (◯N)₃P= | S | C₆H₅ | Cl | 60 | 95-97 |
| 25 | [N(CH₃)₂]₃P= | O | H₃CO–C₆H₄– | Cl | 69 | 146-148 |
| 26 | [N(CH₃)₂]₃P= | O | Cl–C₆H₄– | Cl | 78 | 168-169 |
| 27 | [N(CH₃)₂]₃P= | O | CH₂=CH– | Cl | 79 | 81-82 |
| 28 | Cl<br>(H₅C₂)₂N—P=<br>(N-morpholino) | O | C₆H₅ | Cl | 52 | 72-80 |
| 29 | (NHC₆H₁₃)₂P=<br>H₃C–O | O | C₃H₇ | SCN | 34 | 165/0.06 |
| 30 | (N◯O)₂P=<br>S–C₆H₅ | S | C₆H₅ | Cl | 82 | 50-55 |
| 31 | [N(CH₃)₂]P=<br>(–S–C₆H₅)₂ | O | C₆H₅ | Cl | 87 | 100 |
| 32 | (CH₃–C₆H₄–O)₃P= | O | C₆H₅ | SCN | 62.5 | 107 |

| Example No. | R₅<br>R₂—P=<br>R₂ | Z | R | X | Yield, percent of theory | Melting pt., °C. or boiling pt., °C./mm. Hg |
|---|---|---|---|---|---|---|
| 33 | (CH₃)₂N—P=, with morpholine and -NH-NH-C₆H₅ | O | C₆H₅ | Cl | 57 | 135–138 |
| 34 | C₆H₅—O—P=, with N(CH₃)₂ and -NH-CH₂-CH=CH₂ | O | C₆H₅ | Cl | 50 | 80–87 |
| 35 | (C₂H₅)₂N, Cl—P=, morpholine | O | C₆H₅ | Cl | 52 | 72–80 |
| 36 | benzene fused -NH-P(=)-NH- with piperidine | O | C₆H₅ | SCN | 82 | 248–250 |
| 37 | (morpholine)₂P=, NH-naphthyl | O | C₆H₅ | Cl | 71.5 | 183 |
| 38 | (morpholine)₂P=, benzotriazolyl | O | C₆H₅ | Cl | 60 | 156–158 |
| 39 | (o-CH₃-C₆H₄-O)₂P=, OCH₃ | O | C₆H₅ | Cl | 72 | 68 |
| 40 | C₆H₅—P=, (morpholine)₂ | O | C₄H₉ | SCN | 61 | 150–154/0.08 |
| 41 | C₆H₅—P=, piperidine, NHC₄H₉ | O | C₆H₅ | Cl | 44 | 89–99 |
| 42 | H₃C-C₆H₄—P=, piperidine, OC₂H₅ | O | C₆H₅ | SCN | 90 | 71–76 |
| 43 | [N(CH₃)₂]₂P=, C₄H₉ | O | C₆H₅ | Cl | 44 | 108–111 |
| 44 | (C₆H₅)₂P=, N(CH₃)₂ | O | C₆H₅ | Cl | 77 | 156–157 |
| 45 | (C₆H₅)₂P=, NHC₃H₇ | O | CH₃ | Cl | 72 | 123–126 |

| Example No. | $R_5, R_2, R_3 \diagdown P=$ | Z | R | X | Yield, percent of theory | Melting pt., °C. or boiling pt., °C./mm. Hg |
|---|---|---|---|---|---|---|
| 46 | $OC_2H_5\diagdown P=$ with $C_3H_7$ and $C_6H_5-CH_2$ | O | $C_6H_5$ | SCN | 84 | 141–143 |
| 47 | $OC_2H_5\diagdown P=$ with $C_3H_7$ and $C_6H_5-CH_2$ | O | $C_6H_5$ | Cl | 72 | 105–107 |
| 48 | $P-[N(CH_3)_2]_2$ on triazole ring with $H_2N$, $C_6H_5$ | O | $C_6H_5$ | Cl | 70 | 99–102 |

The novel complex tin compounds according to the present invention have useful properties. More particularly, they exhibit effective antimicrobial activities such as against *Staphylococcus aureus* SG 511, *Candida albicans*, *Aspergillus niger* and the like. In addition, they exhibit insecticidal, acaricidal and herbicidal activities. Further, they are useful as rodent repellents and in the eradication of disease-carrying water snails in the tropics.

By virtue of these properties the compounds according to the present invention may be used as agricultural biocides; as paint additives for the prevention of rot and mold growth; as impregnating agents for textiles, leather, rope and burlap sacks; as impregnating agents for wood against rot and wood pests; as additive for plastics to prevent rotting; as additives for adhesives to prevent bacterial damage; or as additives to marine paints to prevent the growth of algae on the hull of boats and ships.

The compounds according to the instant invention may also be employed for the above purposes in conjunction with other fungicides, bactericides, herbicides and the like, whereby their activity spectrum may be further enhanced. They may be incorporated in customary pesticidal compositions at any desired effective concentration; the preferred concentration is 0.005 to 5% by weight, based on the total weight of the composition.

Thus, a wettable powder may be composed as follows, the percentages being percentages by weight.

20% 5 - amino - 1 - (bis - dimethylamido) - phosphoryl-3-phenyl-1,2,4-triazolo triphenyl tin chloride,
71.5% solid carrier, such as kaolin or silica chalk,
2% wetting and dispersing agent, such as naphthalene sulfonic acid derivatives, and
1.5% adhesion agents and stabilizers, such as methylcellulose.
5% suspension stabilizer, such as calcium lignosulfonate.

The wettable powder is suspended in a sufficient amount of water to achieve the desired concentration of the active ingredient. The resulting aqueous suspension is an excellent fungicidal composition for the purposes set forth above. It should be understood that the wettable powder above is only an illustrative example and that any other compound embraced by Formula I may be substituted for the particular complex tin compound given therein.

We claim:
1. (Bis - dimethylamino) - (3 - phenyl - 5 - amino-1,2,4 - triazolo) - phosphineoxide triphenylchlorostannate of the formula

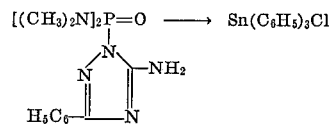

References Cited

UNITED STATES PATENTS 3,321,481   5/1967   Schroder et al. _____ 260—299

ALEX MAZEL, Primary Examiner

BERNARD I. DENTZ, Assistant Examiner

U.S. Cl. X.R.

71—86, 87; 106—15; 252—8.8; 260—239, 247, 247.1, 247.7, 270, 293, 326.85, 429.7, 307, 304, 936, 937; 424—202, 209, 215, 220, 222, 223, 224

PO-1050
(5/69)

UNITED STATES PATENT OFFICE
CERTIFICATE OF CORRECTION

Patent No. 3,502,690     Dated March 24, 1970

Inventor(s) Ludwig Schroder, Klaus Thomas, Richard Sehring and Dietrich Jerchel

It is certified that error appears in the above-identified patent and that said Letters Patent are hereby corrected as shown below:

Col. 1, line 32 - for "methoxyparyl" read --methoxyaryl--;
"   "   "   35 - after "monocycloalkylamino," insert --dicycloalkylamino; monocycloalkenylamino,--;
"   "   "   42 - for "hyddazino" read --hydrazino--;
"   "   "   45 - for "dicpcloalkyl" read --dicycloalkyl--;
"   "   "   51 - for "adyloxy" read --aryloxy--.

Cols. 3, 5 and 9, in the heading of the Table, 

Col. 3, Example 10, for "C$_6$H$_5$CH$_2$NH)$_2$[P=" read --C$_6$H$_5$CH$_2$NH)$_2$P= --.
                                                        OC$_6$H$_5$                        OC$_6$H$_5$ Col. 5, Example 20, correct the formula to read -- 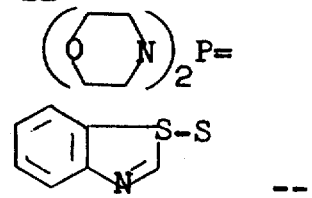 --

Col. 9, Example 48, correct the formula to read -- 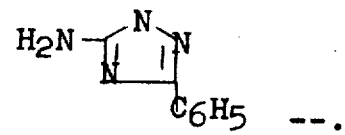 --.

SIGNED AND SEALED

AUG 25 1970

(SEAL)
Attest:

Edward M. Fletcher, Jr.
Attesting Officer

WILLIAM E. SCHUYLER, JR.
Commissioner of Patents